(12) United States Patent
Östling

(10) Patent No.: US 10,064,045 B2
(45) Date of Patent: Aug. 28, 2018

(54) SUBSCRIPTION MANAGEMENT

(71) Applicant: GIESECKE & DEVRIENT GMBH, München (DE)

(72) Inventor: Leif Östling, Bromma (SE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/120,879

(22) PCT Filed: Feb. 20, 2015

(86) PCT No.: PCT/EP2015/000401
§ 371 (c)(1),
(2) Date: Aug. 23, 2016

(87) PCT Pub. No.: WO2015/124316
PCT Pub. Date: Aug. 27, 2015

(65) Prior Publication Data
US 2017/0013440 A1   Jan. 12, 2017

(30) Foreign Application Priority Data
Feb. 24, 2014   (EP) .................................... 14000654

(51) Int. Cl.
*H04B 1/38* (2015.01)
*H04W 8/18* (2009.01)
(Continued)

(52) U.S. Cl.
CPC ....... *H04W 8/183* (2013.01); *H04M 1/72525* (2013.01); *H04W 4/00* (2013.01);
(Continued)

(58) Field of Classification Search
CPC ....... H04W 8/183; H04W 4/00; H04W 4/001; H04W 12/08; H04W 24/10; H04W 48/18;
(Continued)

(56) References Cited

U.S. PATENT DOCUMENTS

2013/0238777 A1*  9/2013  Raleigh ............... H04L 67/1097
                                                      709/223
2014/0033288 A1   1/2014  Wynn et al.
(Continued)

FOREIGN PATENT DOCUMENTS

WO       2010076011 A1      7/2010
WO    WO 2010/076011    *   7/2010
(Continued)

OTHER PUBLICATIONS

Extended European Search Report for corresponding European Application No. 14000654.5, dated Sep. 9, 2014.
(Continued)

*Primary Examiner* — Nay A Maung
*Assistant Examiner* — Angelica M Perez
(74) *Attorney, Agent, or Firm* — Workman Nydegger

(57) ABSTRACT

A method for managing subscriptions on a security element for a mobile end device comprises the following steps: for each subscription of a plurality of subscriptions a quality of service is determined. On the basis of the qualities of service determined for the individual subscriptions a subscription is selected. The selected subscription is subsequently employed for a data communication of the end device with a corresponding communication partner. The method is wherein the managing of the subscriptions is controlled at least partly by an external subscription management device which is distinct from the security element and the end device.

15 Claims, 2 Drawing Sheets

(51) Int. Cl.
  *H04W 48/18* (2009.01)
  *H04W 12/08* (2009.01)
  *H04W 4/00* (2018.01)
  *H04M 1/725* (2006.01)
  *H04W 24/10* (2009.01)
  *H04W 4/50* (2018.01)
  *H04W 4/80* (2018.01)

(52) U.S. Cl.
  CPC ............. *H04W 4/50* (2018.02); *H04W 12/08* (2013.01); *H04W 24/10* (2013.01); *H04W 48/18* (2013.01); *H04M 2203/6063* (2013.01); *H04W 4/80* (2018.02)

(58) Field of Classification Search
  CPC ....... H04W 4/008; H04W 4/50; H04W 48/80; H04M 2203/6063; H04M 1/72725
  USPC ........................................................ 455/558
  See application file for complete search history.

(56) References Cited

U.S. PATENT DOCUMENTS

2015/0057044 A1* 2/2015 Altman ................. H04W 48/18
  455/558
2016/0157170 A1* 6/2016 Daoud Triki ......... H04W 48/18
  370/329

FOREIGN PATENT DOCUMENTS

WO      2011063303 A2    5/2011
WO   WO 2011/063303  *  5/2011

OTHER PUBLICATIONS

International Search Report for corresponding International PCT Application No. PCT/EP2015/000401, dated May 4, 2015.

* cited by examiner

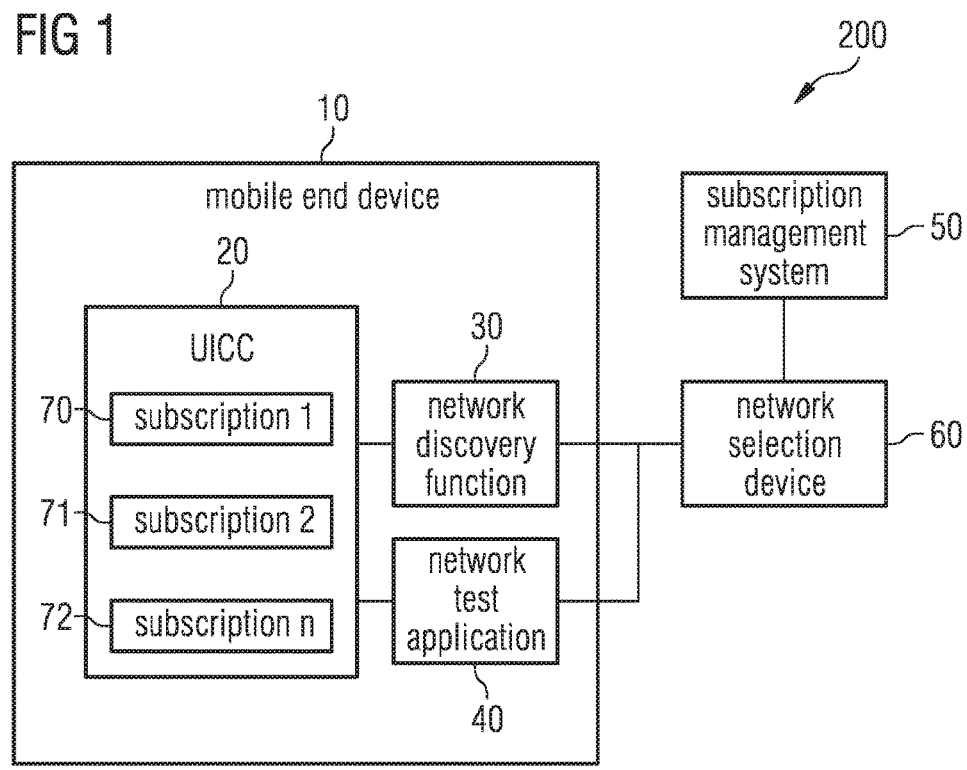

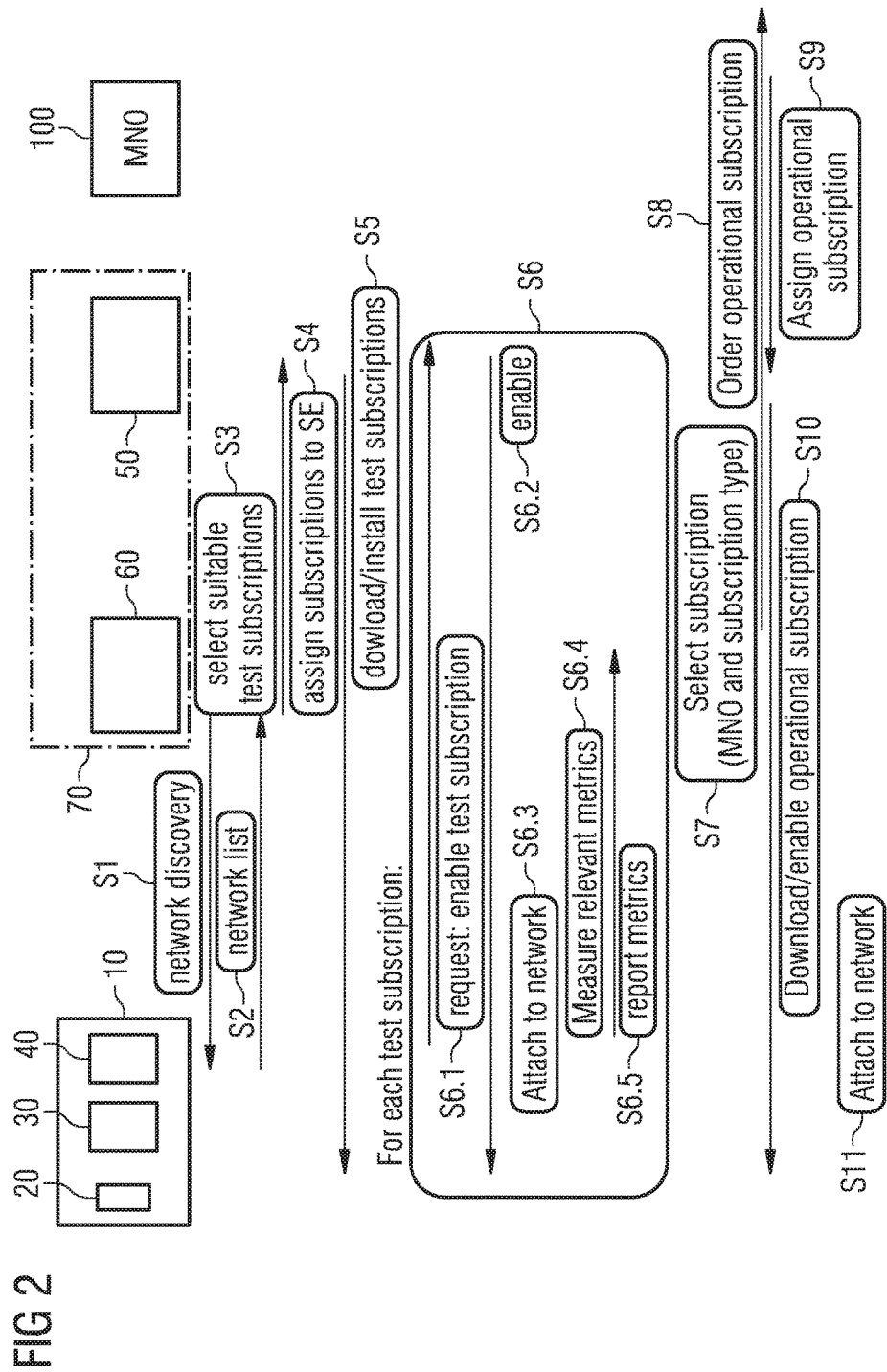

SUBSCRIPTION MANAGEMENT

BACKGROUND

The present invention relates to a method for managing subscriptions on a security element of a mobile end device. The invention further relates to a system that is adapted to carry out the respective method.

The growing number of highly mobile, always connected wireless devices and services such as medical equipment, smart meters, smart phones, tablets, and financial tools are exponentially expanding the demand for wireless access to high-quality mobile networks.

The quality of service provided by a mobile network and an associated subscription varies depending on parameters such as location, time periods, and data usage. Also, different services executed on the mobile end device may have different quality requirements on the mobile network connection. Further, it is also likely that the quantity of available mobile networks for an end device may change during the lifetime of the mobile end device, even though the mobile end device location is not changed.

In general, however, settings relating to the mobile network and subscription to be used for a mobile end device are predefined, e.g. by the personalization settings of the particular security element of the mobile end device. Changing such a setting on the fly is a technically complicated task. Typically, a mobile end device only supports one active subscription at a time.

SUMMARY

The object of the present invention is therefore to take account of the above-mentioned disadvantages and to suggest a method and system for appropriately managing subscriptions on a security element for a mobile end device.

This object is achieved by a method and a system having the features of the independent claims. Advantageous embodiments and developments are stated in the dependent claims.

A preferred embodiment of a method for managing subscriptions on a security element for a mobile end device comprises the following steps:

For each subscription of a plurality of subscriptions, a quality of service is determined. The quality of service is preferably determined using currently measured, actual quality-of-service parameters.

In a further step, a subscription is selected on the basis of the qualities of service determined for the individual subscriptions. The selected subscription can be one of the subscriptions for which a quality of service has been determined. However, as will be described more exactly hereinafter, it is also possible that a subscription is selected for which no quality of service has previously been determined. The subscription is then normally selected on the basis of a quality of service that has been determined for a subscription associated with the selected subscription. The determined quality of service of the associated subscription allows conclusions to be drawn about the quality of service of the selected subscription.

The selected subscription is subsequently employed for a data communication of the end device with a corresponding communication partner.

The method is characterized in that the managing of the subscriptions, i.e. at least one of the steps of determining the quality of service, selecting the subscription or employing the selected subscription, or any steps involved in preparing for one or more of the above-mentioned steps, is controlled by an external subscription management device which is distinct from the security element and the end device.

Functionalities of the subscription management device can be made available in particular by an external server. Such a server or a similar device can be operated by an independent third party.

Since the controlling of subscription management is supported by the external subscription management device, numerous advantages can be achieved. Firstly, subscriptions can be downloaded onto the security element or removed from the security element in line with demand. Likewise, it is possible to temporarily enable or disable individual subscriptions in a targeted manner. Such a so-called "remote subscription management" will be described more exactly hereinafter.

Secondly, a subscription and a network associated with the subscription can be preselected or selected on the basis of information that only the subscription management device has, but not the security element or the end device. Such information might relate for example to the locally and/or temporally available offer of subscriptions of individual network providers. Attention can be paid here in particular to those subscriptions that comply with the preconditions of the particular end device and/or that are of such a nature as to meet the requirements of the applications executed on the end device.

A user of a mobile end device, for example a mobile radio end device, a smart phone or a tablet computer, gains access to a data communication network of a certain network operator by entering into a contractual relationship with the network operator. Such a contractual relationship will hereinafter be designated as a subscription. A subscription is thus normally attached to a network of a specific network operator. It specifies the conditions describing and limiting a data communication of the user over the network. A subscription can be formed by an application installed in a security element of the user's mobile end device. Such an application can also be arranged to manage a plurality of subscriptions. The application has for example the task of securely storing and managing access data necessary for accessing the data communication network of the network operator, for example an access key.

The security element used may be for example a UICC/SIM mobile radio card or a secure region in the end device, a so-called TEE ("trusted execution environment"), to be described more exactly hereinafter.

According to a first preferred embodiment, the subscription management device can control the managing of the subscriptions on the security element by making a preselection with regard to those subscriptions for which a quality of service is to be determined. For this purpose, the subscription management device can for example draw on the offers of different network operators. Further, available offers can be compared with the requirements of the specific end device and/or of the applications to be executed on the end device. Subscriptions recognized as inappropriate from the start can be excluded. In this way, the quality of service is determined only for subscriptions that are basically suitable in the current situation. This makes the method less elaborate as a whole.

According to a second preferred embodiment, the subscription management device can control the managing of the subscriptions by downloading onto the security element at least one of the subscriptions for which a quality of service is determined. The downloading of a subscription can be effected by means of known methods, for example via an over-the-air interface (OTA). The downloading of a subscription may include a possibly necessary installation of the subscription on the security element. The first and second embodiments can be combined.

According to a first variant of the second embodiment, the subscription management device is arranged to download onto the security element a subscription for which a quality of service is subsequently determined. In other words, the subscription whose quality of service is to be determined is not yet present on the security element, being only downloaded onto the security element by the subscription management device to enable the corresponding current quality of service to be determined.

According to a second variant of the second embodiment, there can be downloaded onto the security element by the subscription management device the selected subscription which is employed for the subsequent data communication.

This selected subscription, as mentioned hereinabove, need not necessarily be identical to a subscription for which a quality of service was previously determined. For the quality of service of a subscription can be determined using a test subscription that is associated with the subscription and is suitable and provided only for determining the quality of service. Via the test subscription there can normally be no usual data communication. The latter is done on the basis of a fully operational subscription which is associated with the test subscription. It is consequently possible for the test subscription to be already installed on the security element, but not the corresponding fully operational subscription. In the eventuality that the corresponding subscription associated with the test subscription is selected using the quality of service determined for the test subscription, it can hence be necessary to download this subscription, i.e. the completely operational subscription, onto the security element before the step of employing the subscription.

The possibility of employing such a test subscription instead of the fully operational subscription for determining the quality of service will hereinafter, for the sake of clarity and comprehension, not always be additionally mentioned.

However, it can likewise be provided to already determine the quality of service of a subscription using a fully operational subscription downloaded onto the security element.

The subscription management device can further control the managing of the subscriptions by enabling a subscription on the security element. For this purpose, the subscription management device might have to disable a previously enabled subscription. Normally, the subscription management device controls the managing of the subscriptions on the security element such that no more than one subscription at a time is enabled there.

In the step of determining the quality of service for a subscription, a current, i.e. actually present, quality of service is preferably measured. This is not done using merely estimated or probable values or parameters relating to the quality of service. Further, the quality of service is not determined solely on the basis of general specifications of a network operator. Instead, actual parameters present at the time the quality of service is determined are concretely included in the measurement of the quality of service. Such parameters may be for example the current location of the end device or of the security element, the current time, the current operating state of the end device, the current requirements to be met by a network operator, and the like.

The step of determining the quality of service for a subscription can hence comprise the following substeps:

Where applicable, the subscription, or a test subscription associated with the subscription for the purpose of determining the quality of service, is first downloaded onto the security element.

Subsequently, or if the subscription is already present on the security element, the subscription is enabled.

Thereafter, a communication connection is established with a network associated with the subscription. For the employment of its network, every network operator normally offers one or more different subscriptions, which can differ with regard to the conditions of utilization connected with the subscription.

Subsequently, the quality of service of a corresponding communication connection is concretely measured. That is, the determining of a quality of service of a subscription is understood within the scope of the present invention to be the determining of the quality of service of a communication connection which is concretely present in the communication network associated with the subscription under the conditions specified by the subscription.

Normally, the quality of service of a subscription is determined by means of a quality-of-service determining device of the mobile end device. Said device is arranged to measure the corresponding parameters defining the quality of service.

A hereinabove described method for managing subscriptions on a security element can be triggered in different ways.

Firstly, the mobile end device can recognize events that make it necessary or at least advisable to perform a corresponding method. Such events may be for example the switching on of the mobile end device, the recognizing of a poor quality of an existing network connection, or the recognizing of the fact that no network connection is present. Alternatively or additionally, the method can also be triggered by a user of the end device, for example if he finds the conditions of a currently enabled subscription disadvantageous. Finally, the method can also be triggered by a network operator or by the subscription management device itself.

A system arranged for carrying out a hereinabove described method thus comprises at least one mobile end device having a security element and a described subscription management device.

The end device preferably comprises a device for discovering employable communication networks as well as the hereinabove described quality-of-service determining device.

The subscription management device is preferably arranged, as likewise mentioned hereinabove, to download subscriptions onto the security element, install and enable them there as well as to disable enabled subscriptions and, where applicable, delete them from the security element.

The subscriptions can be present on a conventional, known security element, for example a UICC/SIM card, or be downloaded onto the security element in the form of a virtual SIM (vSIM). The security element preferably is a hardware security element. The security element may be a portable data carrier, e.g. SIM card, secure mass storage card, an NFC card or USB Token. The portable data carrier can be inserted (and removed) from the end device. The security element may as well be embedded in the end device, e.g. a NFC unit, a TPM unit or a eUICC. The security element may also be a "trusted execution environment" (TEE), particularly in accordance with the corresponding Global Platform specifications.

A TEE is in general a secure region and can in principle also be made available merely on the basis of a suitable software architecture within an operating system. However, a TEE is preferably realized by providing separated execution environments within a suitable processor, i.e. a normal region ("normal world") and a secure region ("secure world") that is separated therefrom by hardware-based technology, e.g. booting restrictions by hardware. An accordingly arranged processor is based for example on the known ARM TrustZone® technology. The normal region can be represented by a conventional operating system, for example Android. The secure region is a secure operating system, for example MobiCore.

The subscription management device can further comprise a network selection device which is arranged to select a subscription on the basis of the qualities of service determined for a plurality of subscriptions, as described hereinabove. Alternatively, such a network selection device can also be implemented in the mobile end device or the security element.

BRIEF DESCRIPTION OF THE DRAWINGS

The present invention will hereinafter be described by way of example with reference to the attached drawings. Therein are shown FIG. 1 components of a system according to the invention in a preferred embodiment of the invention, and FIG. 2 steps of a preferred embodiment of a method according to the invention.

DETAILED DESCRIPTION OF VARIOUS EMBODIMENTS

Referring to FIG. 1, there are shown individual components of a preferred embodiment of a system which supports a method for managing subscriptions on a security element of a mobile end device.

The system 200 comprises at least one mobile end device 10 having a security element 20. The security element 20 can be adapted as the UICC or SIM mobile radio card, as shown in FIG. 1. Alternatively, the security element 20 can also be present as a suitable secure region in the end device 10, for example as a "trusted execution environment" (TEE).

The security element 20 can already have one or more subscriptions, or applications, 70, 71, 72 managing the subscriptions, installed therein.

The mobile end device 10 further comprises a device 30 for discovering communication networks as well as a network test application 40 which is arranged to determine a quality of service of a subscription associated with a network.

A subscription management system 50 is arranged to download one or more subscriptions onto the security element 20 of the end device 10, install and enable them there as well as to disable enabled subscriptions and delete subscriptions from the security element 20. The functionalities of the subscription management system 50 can be classed under the term "remote subscription management". The security element 20 is accordingly adapted to enable the subscription management system 50 to manage subscriptions on the security element 20 in such a way.

A network selection device 60 is arranged to select a subscription from a plurality of subscriptions on the basis of qualities of service determined for the subscriptions. The respective quality of service is determined by the network test application 40 of the end device 10, as mentioned above.

In addition to a quality of service, further parameters describing a subscription can enter into the selection process, for example the costs of such a subscription, minimum or maximum contract periods, or the like.

The network selection device 60 receives information on currently available networks as well as on technical features of the end device and/or on requirements of applications executable on the end device from the end device 10 or from the device 30 on the end device 10 for discovering networks. On the basis of this information the network selection device can select those subscriptions to the individual networks that are appropriate for the end device 10 and the applications executable thereon. Further, the network selection device 60 can be arranged to induce suitable subscriptions or test subscriptions associated with these subscriptions for determining a quality of service to be downloaded onto the security element 20 of the end device 10. The downloading of these subscriptions can then be carried out by the subscription management system 50.

The network selection device 60 can be disposed outside the end device 10, as shown in FIG. 1. For example, the functionalities of the network selection device 60 can be offered by an external provider and be made available for example on a server of the provider. It is likewise possible that the subscription management system 50 and the network selection device 60 are made available by the same provider. Alternatively, the network selection device 60 can also be adapted as an application that is executable on the end device 10 or the security element 20.

A preferred embodiment of a method for managing subscriptions on a security element 20 of a mobile end device 10 will hereinafter be set forth by way of example with reference to FIG. 2.

The method can be triggered in different ways. Firstly, it is possible for the method to be triggered by an event recognized by the end device 10. Such an event may be for example the switching on of the end device 10. Further, the end device 10 can recognize that no network connection is present or that the network connection present is of poor quality and thereupon trigger the method described hereinafter. Likewise, it is possible for a user of the end device to trigger the method. Finally, the method can also be triggered by a network operator 100 or by a subscription management device 70.

Such a subscription management device 70 can comprise in particular the functionalities of the subscription management system 50 and, where applicable, of the network selection device 60. In general, the subscription management device is at least partly located externally of the security element 20 and the end device 10, preferably on a server of a corresponding operator. The subscription management device is arranged to control the managing of the subscriptions on the security element 20 of the end device 10 at least partly in the manner described hereinafter.

According to the example shown in FIG. 2, a step S1 of a corresponding method is triggered by the network selection device 60. Thus, the device 30 of the end device 10 for discovering communication networks starts a process for discovering communication networks currently available for the end device 10.

In step S2, the end device 10 sends information accordingly collected by the device 30 to the network selection device 60. This information comprises in particular an indication of available networks, for example in the form of a network list. Additionally, the information transferred to the network selection device 60 can comprise particulars of the end device 10 itself. Finally, the information can describe requirements that applications executable on the end device 10 make on a subscription or on a network associated with the subscription.

In the eventuality that the network selection device 60 is located outside the end device 10, for example on an external server of an operator of the subscription management device 70, the end device 10 can transfer the hereinabove described information to the network selection device 60 via any suitable carrier and any suitable protocol, for example via HTTPS, SMS or USSD.

On the basis of the information received from the end device in step S2, the network selection device 60 selects a plurality of suitable test subscriptions. These test subscriptions are only arranged and provided for determining a quality of service of a corresponding fully operational subscription respectively associated with the test subscription.

In step S4, the network selection device 60 induces the subscription management system 50 to download the corresponding test subscriptions preselected as suitable in step S3 onto the security element 20 of the end device 10 and to install them there.

A corresponding downloading and installing of the test subscriptions is effected in step S5 by the subscription management system 50.

For each of the test subscriptions downloaded onto the security element 20 and installed in step S5, a quality of service is now determined in step S6. For this purpose, a corresponding test subscription must first be enabled. A corresponding enable request can be made by the network test application 40 to the subscription management system 50 in step S6.1 and be carried out by the subscription management system 50 in step S6.2.

In step S6.3, the previously enabled test subscription is attached to the network associated with the subscription.

In step S6.4, relevant parameters relating to the quality of service of the test subscription are concretely measured by the network test application 40.

Corresponding metrics are reported by the network test application 40 to the network selection device 60 in step S6.5.

On the basis of the information received for the respective test subscriptions in step S6.5 and, where applicable, on the basis of further parameters relating to the corresponding subscriptions, the network selection device 60 selects the subscription that is currently optimal for the end device 10 and the applications executable thereon. The selection can further be influenced by information that is already available to the network selection device 60 in a preconfigured manner or that is made available by suitable auxiliary systems in real time.

The selection of the subscription includes a specific network of a network operator as well as a subscription type made available by this network operator from a plurality of subscription types that might be offered.

The network selection device 60 thereupon, in step S8, orders the selected subscription for the security element 20 of the end device 10 from the relevant network operator 100 providing the network associated with the selected subscription.

Alternatively, the network selection device 60 can also send the end device 10 a message that adequately designates the selected subscription. This message can be transmitted for example by SMS or another suitable service. On the basis of this message a user of the end device 10 can himself order the corresponding subscription from the network operator 100.

The network operator 100 in step S9 instructs the subscription management system 50 to download the corresponding subscription onto the security element 20 of the end device 10 and to enable it.

A corresponding downloading and enabling is effected by the subscription management system 50 in step S10.

Finally, in step S11 the end device 10 attaches the downloaded and enabled subscription to the network associated with the subscription. Now the selected and enabled subscription can be employed for a data communication.

In subsequent steps not shown in FIG. 2, the network selection device 60 can instruct the subscription management system 50 to remove the test subscriptions previously (in step S5) downloaded onto the security element 20 from the security element 20. The subscription management system 20 thereupon removes the relevant test subscriptions from the security element 20.

According to an alternative embodiment of a method for managing subscriptions, the downloading of test subscriptions that are provided only for determining a quality of service can be omitted. According to this alternative embodiment, the quality of service is respectively determined from subscriptions already downloaded onto the security element 20.

According to this alternative embodiment, steps analogous to steps S1 to S5 according to FIG. 2 can thus be omitted. Only steps analogous to steps S6.1 to S6.5 are carried out for each subscription already downloaded onto the security element 20 in order to determine corresponding qualities of service. In a subsequent step, analogous to step S7 from FIG. 2, the network selection device 60 then selects the currently optimal subscription for the end device 10. Since such a subscription is already present on the security element 20, it is merely necessary for the subscription management system 50 to enable the selected subscription. Subsequently, the selected and enabled subscription can be employed for a data communication.

The invention claimed is:

1. A method for managing subscriptions on a secure element for a mobile end device, comprising the steps of:
    selecting a subscription on the basis of quality of service of the subscriptions;
    employing the selected subscription for a data communication, wherein the managing of the subscriptions is controlled by an external subscription management device, the controlling including accessing and comparing available subscription offers to one or more requirements of the mobile end device, such that subscriptions recognized as inappropriate for the mobile end device are excluded and quality of service tests for inappropriate subscriptions are avoided;
    measuring, at a radio of the mobile end device, a current quality of service for a first subscription, the measured current quality of service indicating a current data transfer rate that specifies a number of bits being transferred per specified time period;
    measuring a current quality of service for a second, different subscription;
    wherein the subscription that is determined to be optimal for the mobile end device is selected on the basis of the qualities of service determined in the steps of measuring, and wherein the subscription is further selected on the basis of one or more portions of information available to the external subscription management device that are not available to the secure element or to the mobile end device.

2. The method according to claim 1, wherein the subscription management device controls the managing of the subscriptions by the subscription management device making a preselection with regard to those subscriptions for which a quality of service is determined.

3. The method according to claim 1, wherein the subscription management device controls the managing of the subscriptions by the subscription management device downloading onto the secure element at least one of the subscriptions for which a quality of service is to be determined.

4. The method according to claim 1, wherein the subscription management device controls the managing of the subscriptions by the subscription management device downloading the selected subscription onto the secure element.

5. The method according to claim 1, wherein the quality of service of a subscription is determined using a test subscription associated with the subscription, which test subscription is suitable and provided only for determining the quality of service.

6. The method according to claim 1, wherein the subscription management device controls the managing of the subscriptions by the subscription management device enabling a subscription on the secure element.

7. The method according to claim 1, wherein the subscription management device controls the managing of the subscriptions such that no more than one subscription at a time is enabled on the secure element.

8. The method according to claim 1, wherein determining the quality of service includes the step of measuring of the quality of service that is actually present.

9. The method according to claim 1, wherein the step of determining the quality of service for a subscription comprises the following substeps:
enabling the subscription;
establishing a communication connection to a network;
measuring a quality of service of the communication connection.

10. The method according to claim 1, wherein the quality of service of a subscription is determined by means of a quality-of-service determining device of the mobile end device.

11. The method according to claim 1, wherein the method is triggered by an event recognized by the mobile end device or by a user of the mobile end device or by a network operator or by the subscription management device.

12. The method according to claim 1, wherein one or more functionalities of the subscription management device are made available by a server.

13. A system comprising at least one mobile end device having a secure element as well as a subscription management device which are arranged to carry out the method according to claim 1.

14. The system according to claim 13, wherein the subscription management device comprises a subscription management system which is arranged to download subscriptions onto the secure element and delete the subscriptions from the secure element as well as to enable and disable the subscriptions on the secure element.

15. The system according to claim 13, wherein the subscription management device comprises a network selection device which is arranged to select a subscription on the basis of qualities of service determined for a plurality of subscriptions.

* * * * *